(12) United States Patent
Zhang et al.

(10) Patent No.: US 10,547,873 B2
(45) Date of Patent: Jan. 28, 2020

(54) SYSTEM AND METHOD FOR PROVIDING REAL-TIME SUPER-RESOLUTION FOR COMPRESSED VIDEOS

(71) Applicant: Massachusetts Institute of Technology, Cambridge, MA (US)

(72) Inventors: Zhengdong Zhang, Cambridge, MA (US); Vivienne Sze, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 264 days.

(21) Appl. No.: 15/456,788

(22) Filed: Mar. 13, 2017

(65) Prior Publication Data

US 2017/0339431 A1    Nov. 23, 2017

Related U.S. Application Data

(60) Provisional application No. 62/340,203, filed on May 23, 2016.

(51) Int. Cl.
*H04N 19/70* (2014.01)
*G06T 3/40* (2006.01)
(Continued)

(52) U.S. Cl.
CPC .......... *H04N 19/70* (2014.11); *H04N 19/105* (2014.11); *H04N 19/117* (2014.11);
(Continued)

(58) Field of Classification Search
CPC .................................................. G06T 3/4053
See application file for complete search history.

(56) References Cited

U.S. PATENT DOCUMENTS 8,705,896 B2 *  4/2014  Tang ..................... G06T 3/4053
                                                                  382/299
8,896,703 B2 * 11/2014  Corcoran .............. G06T 3/0062
                                                                  348/169
(Continued)

OTHER PUBLICATIONS

Super-resolution using POCS based reconstruction with artifact reduction constrains; Kim; 2005 (Year: 2005).*

(Continued)

*Primary Examiner* — Luis Perez-Fuentes
(74) *Attorney, Agent, or Firm* — Peter A. Nieves; Sheehan Phinney Bass & Green PA

(57) ABSTRACT

A real-time system and method for displaying video on a display are disclosed. Received compressed video data is decoded to produce an uncompressed first video frame, a first frame syntax element, an uncompressed second video frame, and a second frame syntax element. A computationally intensive process is applied to the uncompressed first video frame to produce an enhanced first video frame. A block having a portion of the enhanced first video frame from the enhanced first video frame is adaptively transferred to the uncompressed second video frame to produce an enhanced second video frame without applying the computationally intensive process to the uncompressed second video frame. The transferring is guided by the first frame syntax element and the second frame syntax element. The enhanced first video frame and the enhanced second video frame are displayed.

19 Claims, 5 Drawing Sheets

(51) Int. Cl.

| | |
|---|---|
| *H04N 19/105* | (2014.01) |
| *H04N 19/117* | (2014.01) |
| *H04N 19/124* | (2014.01) |
| *H04N 19/15* | (2014.01) |
| *H04N 19/159* | (2014.01) |
| *H04N 19/46* | (2014.01) |
| *H04N 19/513* | (2014.01) |
| *H04N 19/61* | (2014.01) |
| *H04N 19/86* | (2014.01) |
| H04N 19/172 | (2014.01) |
| H04N 19/176 | (2014.01) |
| H04N 19/182 | (2014.01) |
| H04N 19/184 | (2014.01) |

(52) U.S. Cl.
CPC ........... *H04N 19/124* (2014.11); *H04N 19/15* (2014.11); *H04N 19/159* (2014.11); *H04N 19/46* (2014.11); *H04N 19/513* (2014.11); *H04N 19/61* (2014.11); *H04N 19/86* (2014.11); *H04N 19/172* (2014.11); *H04N 19/176* (2014.11); *H04N 19/182* (2014.11); *H04N 19/184* (2014.11)

(56) References Cited

U.S. PATENT DOCUMENTS

| | | | |
|---|---|---|---|
| 9,734,557 B2* | 8/2017 | Wey | ............... G06T 3/4053 |
| 2002/0176624 A1 | 11/2002 | Kostrewski et al. | |
| 2007/0019887 A1* | 1/2007 | Nestares | ............... G06T 3/4053 382/299 |
| 2008/0151991 A1* | 6/2008 | Trimeche | ................. G06T 3/40 375/240.01 |
| 2008/0298639 A1* | 12/2008 | Tsunekawa | ........... G06T 3/4007 382/107 |
| 2009/0168882 A1 | 7/2009 | Sadowski et al. | |
| 2010/0272184 A1* | 10/2010 | Fishbain | ............... G06T 3/4069 375/240.16 |
| 2013/0223533 A1 | 8/2013 | Tourapis et al. | |
| 2014/0254688 A1 | 9/2014 | Tian et al. | |
| 2015/0172726 A1 | 6/2015 | Faramarzi et al. | |
| 2016/0063316 A1* | 3/2016 | Lee | ................... G06K 9/00295 382/118 |

OTHER PUBLICATIONS

NPL Google search; 2019. (Year: 2019).*
Super-resolution image reconstruction; 2003. (Year: 2003).*
Super resolution from a single image; Glasner; 2009. (Year: 2009).*
Enhanced Deep Residual Networks for Single Image Super-Resolution; Lim; 2004. (Year: 2004).*
Super-resolution using POCS reconstruction with artifact reduction constrains; Kim; 2005. (Year: 2005).*
Single-Image Super-Resolution Using Sparse Regression and Natural Image Prior; Kim; 2010. (Year: 2010).*
International Search Report and Written Opinion for PCT/US17/22004, dated May 23, 2017.
Zhengdong Zhang and Vivienne Sze; FAST: Towards Real-Time Super-Resolution for Compressed Videos; arXiv:1603.08968v1 [cs.CV] Mar. 29, 2016.

* cited by examiner

SYSTEM AND METHOD FOR PROVIDING REAL-TIME SUPER-RESOLUTION FOR COMPRESSED VIDEOS

CROSS-REFERENCE TO RELATED APPLICATIONS

This application claims the benefit of U.S. Provisional Patent Application Ser. No. 62/340,203, filed May 23, 2016, entitled "FAST: Free Adaptive Super-Resolution via Transfer for Compressed Videos," which is incorporated by reference herein in its entirety.

FIELD OF THE INVENTION

The present invention relates to video processing, and more particularly, is related to optimizing video processing by leveraging existing compression parameters.

BACKGROUND OF THE INVENTION

High resolution displays are garnering increasing popularity. Televisions with 8K resolution (7680×4320 pixels) display are already available for sale, and even a cellphone can have 4K Ultra-HD (high definition) resolution (3840×1260 pixels). Unfortunately, the availability of high resolution media content has not kept up with the increase in display resolutions. For example, one popular video streaming service currently offers only 26 titles in 4K Ultra-HD resolution. In addition, transmitting 4K Ultra-HD video requires high communication bandwidth. Given the abundant amount of existing lower resolution videos, as well as limited communication bandwidth, it would be desirable to up-sample these videos to higher resolution at the display.

The default up-sampling on televisions is typically simple interpolation and filtering with added sharpening. Due to the simplicity of these methods, the visual quality of the output is generally not satisfactory. Super resolution (SR) can provide higher visual quality results by exploiting the non-local similarity of patches or learning a mapping relating pixels from the low-resolution videos to pixels of high-resolution videos from external datasets. However, SR algorithms are computationally more expensive and slower than simple interpolation/filtering. For instance, state-of-the-art neural network based SR algorithms require powerful graphical processing units (GPUs) such as the NVIDIA Grid K2 8GB graphics card that consume around 225W to achieve real-time performance. The speed and power consumption of these algorithms, therefore, limit their applicability to televisions and mobile screens.

There are two main forms of super-resolution algorithms: single frame and multiple frame. Typically, televisions use simple single-frame based up-samplers, including bicubic, sinc, Lanczos, Catmull-Rom, and Mitchell-Netravali. These up-samplers are generally based on simple splines, enabling real-time throughput. However, since these methods are not content adaptive, they may introduce unwanted video artifacts.

More sophisticated super-resolution algorithms typically leverage machine learning techniques. Among them are sparse-representation, Kernel Ridge Regression (KRR), anchored neighbor regression (ANR), and in-place example regression. More recently, deep neural networks have been used to perform super-resolution (e.g. SRCNN). Such methods apply several layers of convolution and non-linear functions to map the low-resolution image to higher resolution. They achieve state-of-the-art results, but at high computation cost. As an example, SRCNN use filters of size 9×9×64, 64×32, 32×5×5, which amounts to 8032 multiplications per pixel. Hence, it is significantly more complicated than simple interpolation with one filter.

Even if consumer devices can be accelerated with high powered GPUs (e.g., K2 consumes 225W) to achieve real-time performance, these GPUs consume far too much power to be embedded in televisions and portable devices like phones and tablets. Moreover, even with high computation resources, these super-resolution algorithms can only achieve real-time throughput on high-definition (HD) videos (1920×1080), and not on videos of 4K resolution and beyond. Complementary to learning approaches, there are algorithms that exploit the self-similarities of blocks within each image. However, they are much slower than SRCNN.

Previous multiple-frame based super-resolution algorithms have been largely based on the registration of neighboring frames. Many of these algorithms are iterative, including the Bayesian based approach and a $l_1$-regularized total variation based approach. At the same time, there are non-iterative methods that avoid registration with non-local mean and 3D steer kernel regression. Deep neural networks can also be used in the form of bidirectional recurrent convolutional networks, and deep draft-ensemble learning. Unfortunately, these multiple-frame algorithms are generally too slow for real-time applications and are generally run offline. Other video coding techniques, for example, motion compensation and Group-of-pictures (GOP) structure are similarly problematic. Therefore, there is a need in the industry to address one or more of the abovementioned shortcomings.

SUMMARY OF THE INVENTION

Embodiments of the present invention provide a system and method for providing real-time super-resolution for compressed videos. Briefly described, the present invention is directed to a real-time system and method to display video. Received compressed video data is decoded to produce an uncompressed first video frame, a first frame syntax element, an uncompressed second video frame, and a second frame syntax element. A computationally intensive process is applied to the uncompressed first video frame to produce an enhanced first video frame. A block having a portion of the enhanced first video frame from the enhanced first video frame is adaptively transferred to the uncompressed second video frame to produce an enhanced second video frame without applying the computationally intensive process to the uncompressed second video frame. The transferring is guided by the first frame syntax element and the second frame syntax element. The enhanced first video frame and the enhanced second video frame are displayed.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1:
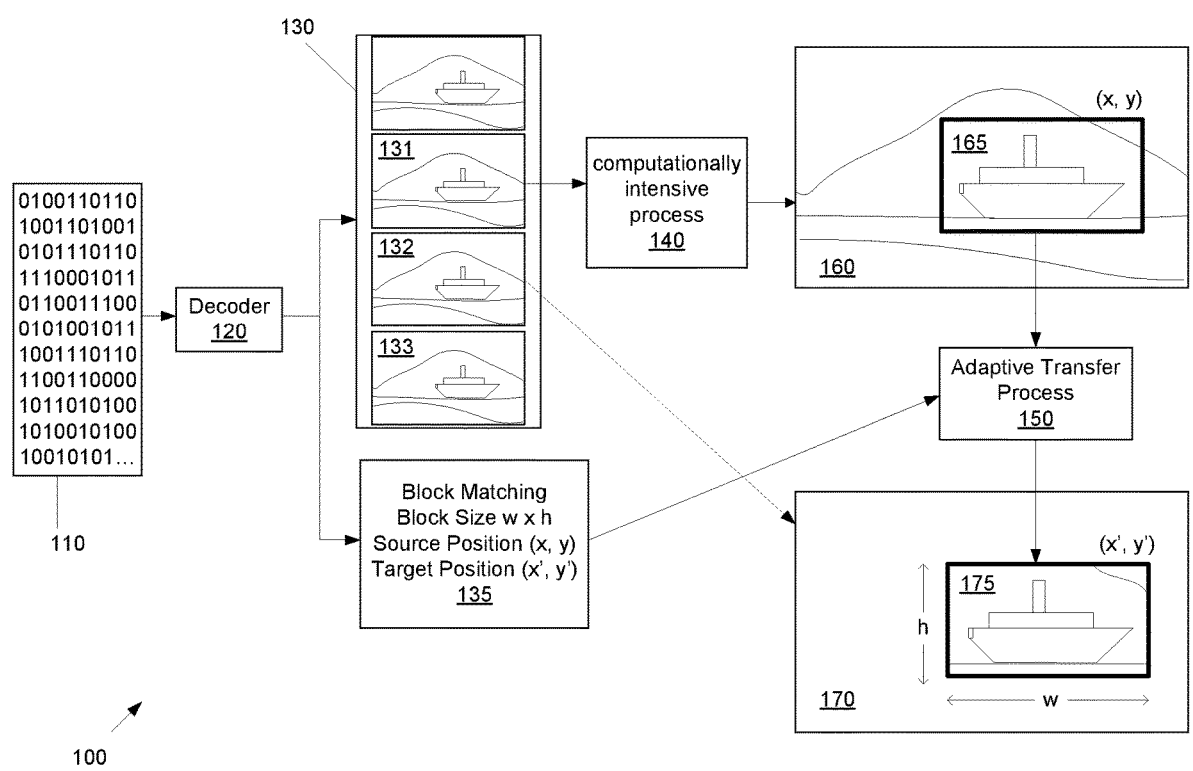
FIG. 1 is a block diagram illustrating a first embodiment of a real-time video processing system.

Reference will now be made in detail to embodiments of the present invention, examples of which are illustrated in the accompanying drawings. Wherever possible, the same reference numbers are used in the drawings and the description to refer to the same or like parts.

The embodiments of the present invention disclosed herein share some insights in common with in-place regression which performs local block prediction inside the same frame, but the embodiments in addition importantly employ predictions across frames, which may be of negligible cost when exploiting embedded information in compressed videos.

The embodiments illustrate examples of one aspect of the present invention, called Free Adaptive Super resolution via Transfer (FAST) to accelerate existing single image based SR algorithms. FAST leverages the inter-frame similarity between adjacent frames in a video sequence. FAST transfers the SR result from a first frame to a second frame and, in some cases, subsequent frames, such that SR is only directly applied to a subset of frames. The information leveraged for the transfer is already embedded in the compressed video, and the processing used for the transfer has a computational cost comparable to bicubic interpolation. Therefore, the transfer step has negligible run time and computation cost compared with the original SR algorithms. As used within this disclosure, the terms "transfer" and "transferring" refer to copying/replicating of pixels, blocks and/or syntax elements from a first video frame to a second video frame.

As will be described in detail below, the FAST framework performs the following: transfer of super-resolution pixels using motion compensation; adaptive transfer for higher visual quality (i.e., PSNR); non-overlapping block structure for reduced computation combined with deblocking filtering to reduce blocking artifacts; and exploit block statistics for reduced computation.

It should be noted that while the embodiments are generally directed to application of super resolution to frames using embedded video compression parameters, the invention is not limited to super resolution. A person having ordinary skill in the art will recognize that other types of video processing may be used in conjunction with or instead of super resolution process, including, for example, but not limited to, de-noising, dynamic range expansion, object recognition/detection, optical flow estimation, time-to-contact estimation, tracking in videos, video stabilization, video segmentation, frame interpolation, scene understanding, deblurring, high dynamic range enhancement, and visual style editing, among others.

Compressed video formats, for example, bit streams compressed using MPEG or ITUT compression, contain information relating pixels between frames, including, for example, motion vectors, block structure, residual/prediction error, transform coefficient, prediction mode (inter/intra), and intra prediction mode direction, among other parameters. FAST leverages this information to transfer super resolution data from a first frame to a second frame, without application of the super resolution process to the second frame.

Figure 2:
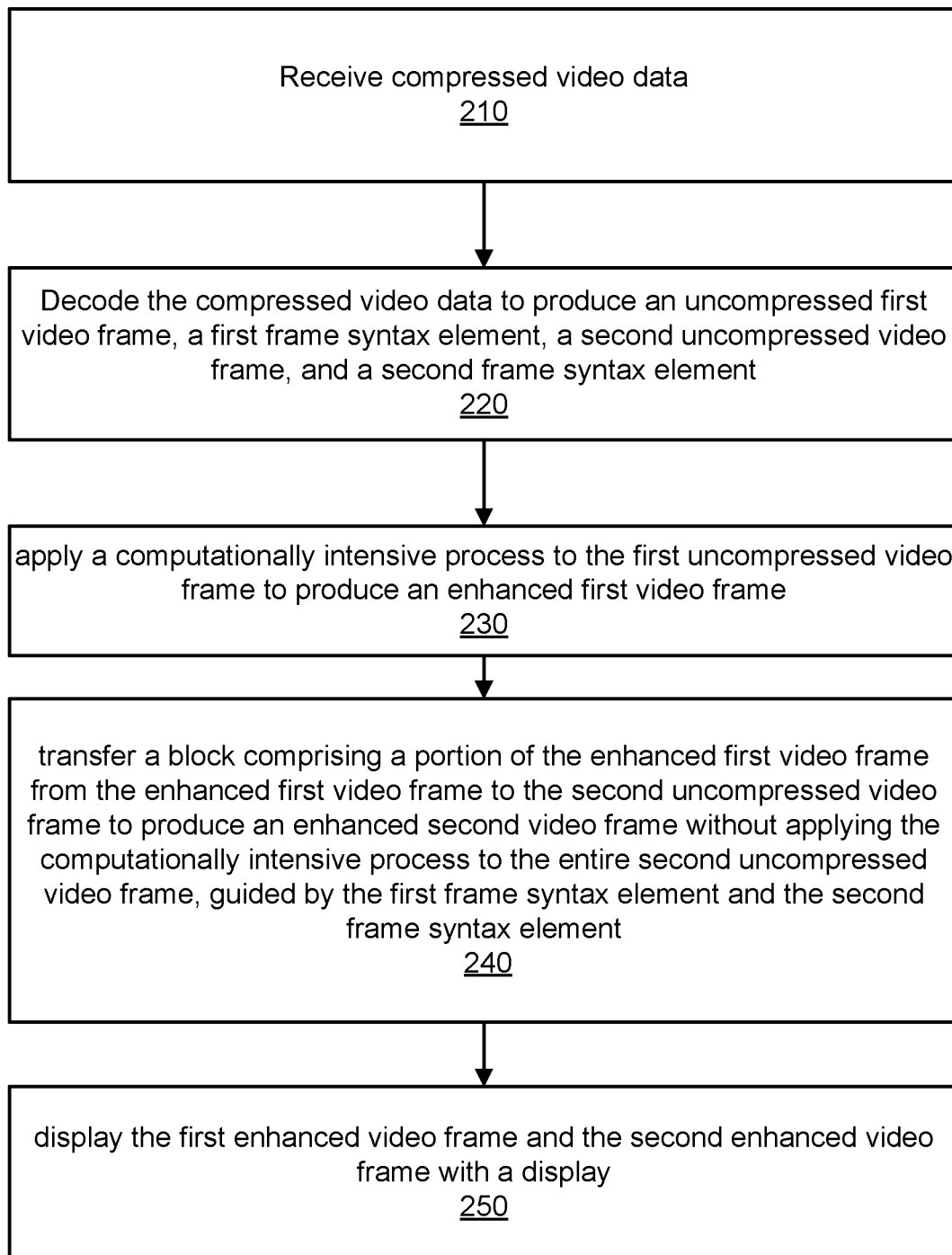
FIG. 2 is a flowchart showing the main steps of the first embodiment of FIG. 1.

FIG. 1 is a block diagram 100 illustrating the FAST process. FIG. 2 is a flowchart 200 showing the main steps of FAST. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Compressed video data is received, as shown in block 210. For example, the compressed video data may be a bit stream 110, or the compressed video data may be stored in a file. The compressed bit stream 110 is decoded, for example, with a decoder 120, to produce uncompressed video frames 130, and syntax elements 135, as shown in block 220. FIG. 1 only shows a small subset of possible syntax elements 135 for purposes of simplicity. The syntax elements 135 may include, but are not limited to motion vectors, block structures, residual and/or prediction error, transform coefficients, inter-prediction modes, intra-prediction mode, intra prediction mode directions, skip flags, merge flags, coded block flags which indicate of residual are all zero, and/or motion vector is zero, loop filter parameters, quantization parameters and/or a reference index that indicates a specific reference frame.

The syntax elements generally include information used by the video compression algorithm to relate objects in successive frames. For example, the uncompressed video frames may include an uncompressed first video frame 131, and an uncompressed second video frame 132. The syntax elements 135 may include, a first frame syntax element, in this case, dimensions (w (width),h (height)) and source position coordinates (x,y) for a first block 165 and a second frame syntax element including dimensions (w,h) and target position coordinates (x', y') for a second block 175.

A computationally intensive process 140 is applied to the uncompressed first video frame 131 to produce an enhanced first video frame 160, as shown by block 230. For example, the computationally intensive process may include super resolution upscaling. It should be noted that the computationally intensive process 140 may share processing modules and/or hardware modules/resources with the decoder 120.

An enhanced second video frame 170 is produced without employing the computationally intensive process 140. Instead, a block 165 comprising a portion of the enhanced first video frame from the enhanced first video frame 160 is transferred to the uncompressed second video frame 132 to produce an enhanced second video frame 170, as shown by block 240. The transferring is guided by the syntax elements 135, as will be described in detail below. The enhanced first video frame 160 and the enhanced second video frame 170 may be displayed, for example, with a video display (not shown), as shown by block 250. Alternatively, the computationally intensive process 140 may only be applied to a portion of the enhanced second video frame 170, for example, to a subset of one or more blocks of pixels within the enhanced second video frame 170, as is described herein below.

As described further below, a uncompressed third video frame 133 may be used to produce an enhanced third video frame (not shown) from the enhanced second video frame 160 using the syntax elements 135 in a similar manner without employing the computationally intensive process 140.

It should be noted that the transfer step alone can introduce visual degradation. FAST addresses this by adaptively enabling and disabling the transfer via a model that measures the visual quality loss, as described below. To further accelerate the processing, FAST may use non-overlapping block structure embedded in the compressed 110 video, rather than the overlapping blocks traditionally used for SR. FAST applies a lightweight blocking filter, for example, a High Efficiency Video Coding (HEVC) deblocking filter to remove the resulting blocking artifacts. FAST adapts its processing to the varying video content (e.g., blocks with different sizes, blocks with zero motion vector and zero residuals) for additional acceleration.

The decoder 120 decompresses a compressed video 110 to be $\alpha \in Z^+$ times larger. Here, $\alpha$ is the scale of the up-sampling. For example, up-sampling a video from 1920×1080 (full HD) to 3840×2160 (4K) would have $\alpha=2$. In practice, a may be set to 2, 3 or 4. However, theoretically $\alpha$ may be any positive integer, which forms a set $Z^+$, i.e., the set of positive integers.

For simplicity, the following explanation only considers two adjacent frames, the uncompressed first video frame 131 and the uncompressed second video frame 132, where some blocks in the uncompressed second video frame 132 are predicted by motion compensated blocks in the uncompressed first video frame 131, as indicated by the syntax elements 135. The goal is to compute higher resolution images for the enhanced first video frame 160 and the enhanced second video frame 170. It is understood that the enhanced first video frame 160 and the enhanced second video frame 170 have a higher resolution than the uncompressed first video frame 131 and the uncompressed second video frame 132. Some blocks in the uncompressed second video frame 132 may not be predicted from frame 131, and instead may be intra-predicted, and thus are not transferred. For such intra predicted blocks in 132, SR may be applied, bicubic processing may be applied, or another low complexity up-sampling approach may be applied.

The computationally intensive process 140, for example, an SR algorithm, is applied on the uncompressed first video frame 131 to obtain the enhanced first video frame 160. Instead of applying the computationally intensive process 140 on the uncompressed second video frame 132 to get the enhanced second video frame 170, temporal correlation with information from the syntax elements 135 are exploited to transfer (copy without additional processing) pixels from the enhanced first video frame 160 to the enhanced second video frame 170.

The adaptive transfer process 150 transfers pixels from the enhanced first video frame 160 to the enhanced second video frame 170 block by block. For example, the first block 165 and second frame syntax elements 135 including the dimensions (w,h) and a target position (x', y') may be combined with an up-sampled low-resolution residual for the target block from the uncompressed second video frame 132 to form a higher resolution block in the enhanced second video frame, namely the second block 175. The second block 175 incorporates the enhancement of the first block 165 as applied to the enhanced second frame 170 via the computationally intensive process 140, compensating for relative position/motion within the enhanced second frame 170 using syntax elements 135 such as positional information, predicted direction information, motion vectors and the like. If the position of the second block 175 within the enhanced second frame 170 includes a fractional portion (that is, the position of the second block 175 within the enhanced second video frame 170 does not align on pixel mappings of the enhanced second frame 170), the adaptive transfer process 150 may employ interpolation to approximate the position.

The adaptive transfer process 150 may skip applying the computationally intensive process 140 to the second frame entirely, and all operations in the adaptive transfer process 150 may be of lower complexity than SR, for example, similar in complexity to bicubic up-sampling. This gives significant savings in computation compared to that of modern SR algorithms such as SRCNN.

The adaptive transfer process 150 may use intra-prediction for the transfer of some blocks to the enhanced second video frame 170 where there are no super-resolution results to transfer. Typically, this is relatively infrequent, and relates to blocks containing very simple textures. Therefore, the adaptive transfer process 150 may up-sample these blocks using, for example, bicubic up-sampling.

A motion vector in the syntax elements 135 may be pixel accurate or sub-pixel accurate, which has a large impact on the visual quality of the enhanced second frame 170.

The adaptive transfer process 150 may be applied using integer pixel, half-pixel and quarter pixel accuracy. The Peak Signal-to-Noise Ratio (PSNR) generally increases with the higher of motion vector accuracy, indicating the desirability of using a quarter-pixel motion vector. Fortunately, motion vectors with quarter pixel accuracy are available in modern video codecs which is sufficient to enable high quality transfer. The motion vectors, as with all the syntax elements 135, are embedded in the compressed video, and do not increase the computational load on the adaptive transfer process.

In practice, motion compensation may not be exact. The adaptive transfer process 150 applies up-sampling to a resulting residual, for example, bicubic up-sampling, which may introduce two types of errors: ringing artifacts in a single frame and accumulated error across multiple frames.

Figure 3:
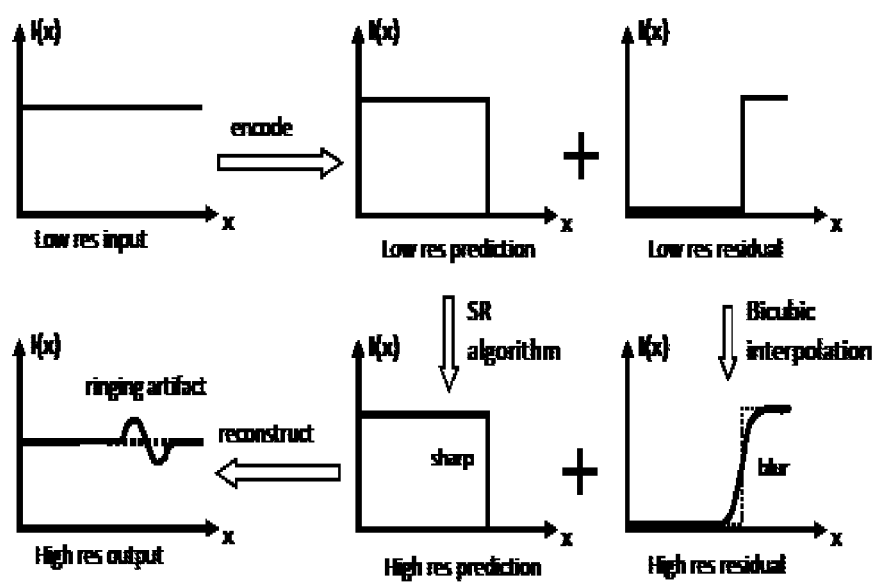
FIG. 3 is a series of graphs showing ringing and blurring addressable by using thresholds with the adaptive transfer process.

Some blocks 165 may have prediction residual high in energy and may contain sharp edges, which causes ringing artifacts on the transferred output. Such artifacts typically occur on the smooth image regions, rather than at sharp edges. Intuitively, this occurs when the encoder predicts a smooth region with a source block that contains a sharp edge. Consequently, the prediction residual may also have a sharp edge at the same position. By running the computationally intensive process 140 on the source frame 131, the sharp edge is preserved in the enhanced first frame 160, but the edge on the residual may be blurred in the resulting enhanced second frame 170 due to bicubic interpolation of the adaptive transfer process 150. The combination of a sharp edge with a blurry edge unsurprisingly creates ringing artifacts, as shown in FIG. 3.

To avoid the ringing artifacts, the adaptive transfer process 150 may compute a mean absolute magnitude of the residual block, and compare the mean absolute magnitude to a residual threshold $\eta$ to decide whether or not to transfer the block, as described further below. If the magnitude of the residual is below the residual threshold η, a transfer is performed. Otherwise, the low-resolution block may be directly up-sampled, for example, using bicubic interpolation.

To properly learn the residual threshold many pairs of source and target images may be collected, and synthetically down-sampled to lower resolution. Then the low-resolution target image is divided into blocks. For each low resolution target block the best prediction block on the source image is searched for the result that gives the smallest prediction error. Here the mean sum of absolute difference (SAD) is used as the error metric. $e_i$ denotes the resulting prediction error for a corresponding block $P_i$. The superscript h stands for high-resolution, t stand for transfer, and b stands for bicubic interpolation. Given the transferred outputs ($P_i^{h;t}$) and the up-sampled residual with bicubic interpolation ($P_i^{h;b}$), the respective PSNR, $y_i^t$ and $y_i^b$ may be computed. Assuming the adaptive transfer process 150 only transfers when $e_i<\eta$, then the residual threshold η may be chosen to maximize the PSNR across all blocks with the following optimization:

$$\max_\eta \sum_{i, e_i \leq \eta} y_i^t + \sum_{i, e_i > \eta} y_i^b \quad \text{(Eq. 1)}$$

While thresholding the image content in order to adaptively apply either bicubic interpolation or sophisticated super-resolution methods has typically been used as an acceleration tool, the adaptive transfer process 150 incorporates thresholding the image content to achieve higher visual quality. This may also be achieved during in-place example regression SR by decomposing a block to an in-place prediction and its residual. In place example regression SR typically performs worse without thresholding. However, proper thresholding provides significantly higher PSNR.

Up-sampling the residual to the higher resolution using bicubic interpolation as an approximation introduces errors, as is shown in Eq. (2) and (3). In a chained GOP structure (IPPP), a frame is always predicted by the previous frame; thus the error gets accumulated. If large enough, this error can degrade the visual quality of the transferred frame, for example, via artifacts such as blurred regions or jagged edges. The described embodiments incorporate a model to quantify the accumulated error, on which a threshold may be performed to decide whether the accumulated error is acceptable, or whether instead SR should be applied to the next frame.

Specifically, let us denote the result of FAST at frame t by $P^h_t$, (x) as opposed to the SR result $P^h_t(x)$. Under this notation, a Taylor expansion approximation of SR and FAST rendered frames may be written as:

$$P_t^h(\alpha x) = f_{ar}(P_{t-1}^1(x + dx_{t-1 \to t})) + (\nabla f_{ar}, R_{t-1 \to t}^1(x))$$

$$P_t^{h1}(ax) = P_{t-1}^{h1}(\alpha(x + dx_{t-1 \to t})) + b(R_{t-1 \to t}^1(x)) \quad \text{(Eq. 2)}$$

Defining the transfer error as $e^h_t(\alpha x)$ as the difference between the FAST frame and the SR frame and substituting into Eq. 2 results in $$e_t^h(\alpha x) = P_t^{h'}(\alpha x) - P_t^h(\alpha x) \quad \text{(Eq. 3)}$$
$$= (P_{t-1}^{h'}(\alpha(x + dx_{t-1 \to t})) + b(R_{t-1 \to t}^l(x))) -$$
$$(f_{sr}(P_{t-1}^l(x + dx_{t-1 \to t})) + \langle \nabla f_{sr}, R_{t-1 \to t}^l(x) \rangle)$$
$$= (P_{t-1}^{h'}(\alpha(x + dx_{t-1 \to t})) - P_{t-1}^h(\alpha(x + dx_{t-1 \to t}))) +$$
$$(b(R_{t-1 \to t}^l(x)) - \langle \nabla f_{sr}, R_{t-1 \to t}^l(x) \rangle)$$
$$= (e_{t-1}^h(\alpha(x + dx_{t-1 \to t})) + (b(R_{t-1 \to t}^l(x)) -$$
$$\langle \nabla f_{sr}, R_{t-1 \to t}^l(x) \rangle)$$

This expression may be reduced to $$e_t^l(x) = e_{t-1}^l(x + dx_{t-1 \to t}) - \Delta R_{t-1 \to t}^l(x) \quad \text{(Eq. 4)}$$

This suggests that the transfer error of a new frame is the motion compensated transfer error from the previous error plus the Laplacian of the residual of the current frame. Therefore, the Laplacian of the residual gets accumulated. The computation for this error only involves simple interpolation and addition. For each block, the FAST framework may compute the average absolute magnitude of the accumulated error. If average absolute magnitude of the accumulated error is above a given threshold, for example, the residual thresholdr η described previously, the transfer is stopped and the SR algorithm is applied to its lower-resolution decoded block 132. This resets the accumulated error to 0.

Figure 4:
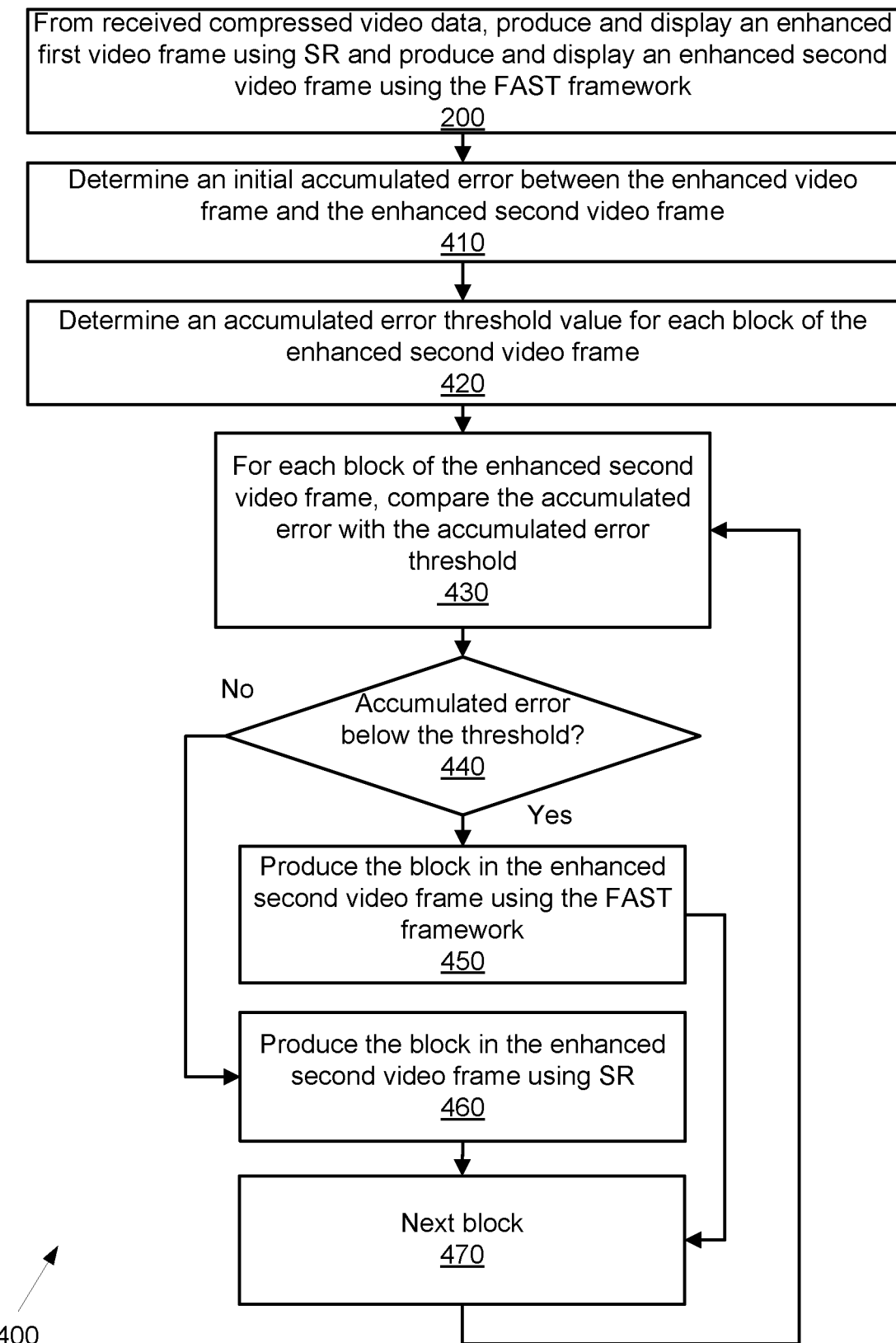
FIG. 4 is a flowchart of an exemplary process for applying accumulated error analysis to the FAST framework of FIG. 2.

FIG. 4 is a flowchart 400 of an exemplary process for applying accumulated error analysis to the FAST framework. An enhanced first video frame is produced and displayed from received compressed video data using SR, and an enhanced second video frame is produced and displayed from received compressed video data using the FAST framework, as shown by block 200. It should be noted that an expanded version of block 200 is shown by FIG. 2. An initial accumulated error between each block of the enhanced video frame and the enhanced second video frame is determined, as shown by block 410. An accumulated error threshold value, for example the residual threshold is determined, as shown by block 420. For each block in the enhanced second video frame, the accumulated error is compared with the accumulated error threshold, as shown by block 430. If the accumulated error is below the error threshold, a corresponding block in the next enhanced video frame is produced using the FAST framework, as shown by blocks 440 and 450. If the accumulated error meets or exceeds the error threshold, a corresponding block in the next enhanced video frame is produced using SR, as shown by blocks 440 and 460. As shown by block 470, the block comparison continues for each block of the enhanced second video frame.

The content of different blocks within a frame may result in different types of accumulated error. For example, smooth blocks (blocks that do not contain well defined edges) do not introduce accumulated error in general. A non-occluding edge is often well-predicted from the same edge in the previous frame, so the residual magnitude may generally be small enough to be disregarded whether the block is moving or not. Also, the accumulated error is not dependent on the low-frequency component of the residual. So for blocks with changing brightness, the accumulated error may still be negligible. If a block lies on a moving occluding edge in a highly textured area, the error may accumulate rapidly due to the new and unpredictable textures that come out of the occlusion.

While the above embodiment uses accumulated error as an exemplary metric for adaptive transfer, for example, determining when to revert to SR processing over FAST, the same methodology may use metrics for adaptive transfer indicating a quality and/or computation cost change between subsequent frames and/or blocks. For example another decision making metric involves transfer between neighboring blocks in a frame. If FAST determines one block is to be transferred, then it is likely that neighboring blocks should also be transferred for better spatial consistency. This spatial relationship between the blocks is quantifiable and may serve as a factor in the metric for making a decision during adaptive transfer.

The rate of error accumulation for FAST depends on the GOP structure. The chained GOP structure (IPPP) yields poor FAST results because the error is accumulated across frames sequentially. Other GOP structures result in better FAST results. For example, in the IBBP GOP structure, the error is only accumulated twice (I→P→B).

Most of the SR algorithms divide an image into densely overlapped blocks, and average the output on these overlapped blocks to avoid discontinuities on the block boundaries. This is computationally very expensive since one pixel in a frame is processed multiple times in different blocks that cover it. While the above embodiments may be implemented using densely overlapped blocks, the FAST framework preferably uses a non-overlapping block structure used in video coding, so that each pixel is covered by exactly one block. Hence each pixel is only processed once, which significantly reduces the number of computations. An image may be adaptively divided into non-overlapping blocks, with larger blocks corresponding to simple and well-predicted content.

While use of a non-overlapping block structure may introduce artificial edges on the block boundary, FAST addresses this by applying an adaptive deblocking filter, for example, but not limited to the deblocking filter used in H.265/HEVC. The main objective of the deblocking filter is to remove the artificial edges on the block boundary due to non-overlapping block based coding while keeping the true edges. An important heuristic is that an edge tends to be artificial if there is little variations on both sides of the block boundary. Additional information like the difference of motion vectors can also help to determine whether to apply the deblocking filter on each block edge. The smoothing strength of the deblocking filter is determined based on the statistics of the pixels near the block boundary. The capability of non-overlapping blocks with deblocking filter is also recognized in video coding where such a technique achieves comparable visual quality with techniques using overlapped blocks. The H.265/HEVC deblocking filter is very lightweight, for example, accounting for on the order of 15-20% of the cycles in the whole decoder running on an ARM processor, and only 3% of the power consumption of a low power H.265/HEVC decoder chip.

The output of FAST on a pixel in the high resolution frame is the combination of the transferred pixel itself and the bicubicly up-sampled residual, each of which may involve either motion compensation interpolation for fractional motion vectors, or bicubic interpolation for up-sampling.

To reduce computations, FAST may leverage the following two conditions to avoid unnecessary interpolations for certain blocks. First, for blocks with zero motion vector (pixels in zero motion vector blocks), FAST may directly copy the same pixels from the previous frame to the subsequent frame without interpolation. Second, for blocks with zero residual the bicubic interpolation on the residual can be skipped. The embodiments may check for both conditions by looking at the syntax element for each block. For example, the compressed video contains a bit for each block called the skip flag, which indicates whether the residual is all zero or not. FAST can also check the value of the motion vectors to see if motion compensation interpolation needs to be applied. Once a block satisfies either of the conditions, FAST applies the corresponding short-cut to all the pixels within the block.

TABLE 1

Table 1 summarizes the operations available to FAST for different types of blocks.

| | Block types | | | | |
|---|---|---|---|---|---|
| | Anchored | Intra | Inter zero residual | Inter zero mv | Inter |
| SR algorithm | ✓ | | | | |
| Bicubic upsampling | | ✓ | | ✓ | ✓ |
| Motion compensation | | | ✓ | | ✓ |

Anchored blocks are the blocks where transfer is skipped and SR is applied. Intra means intra-predicted blocks. Inter refers to inter-predicted blocks. Motion vector is abbreviated into mv. A check mark indicates that the operation is indicated by FAST for the corresponding blocks. For frames with more blocks satisfying either of the two conditions above, the more computation reduction FAST can enjoy. In practice, these two conditions are not uncommon, and may be met by many blocks from compressed videos. Overall, these two conditions may further reduce the computation cost of FAST by more than half than when these conditions are not considered.

As noted above, in H.264/AVC and H.265/HEVC, frames may be divided into blocks of varying size, with larger blocks assigned to flat or well-predictable regions and smaller blocks assigned to highly textured areas. FAST may gain additional efficiencies by copying and skipping the pixels that belong to large blocks with a single check on residual skip-flag and zero motion vector. It has been observed that often a significant portion of pixels that are copied or skipped, rather than processed, belong to largest blocks.

Figure 5:
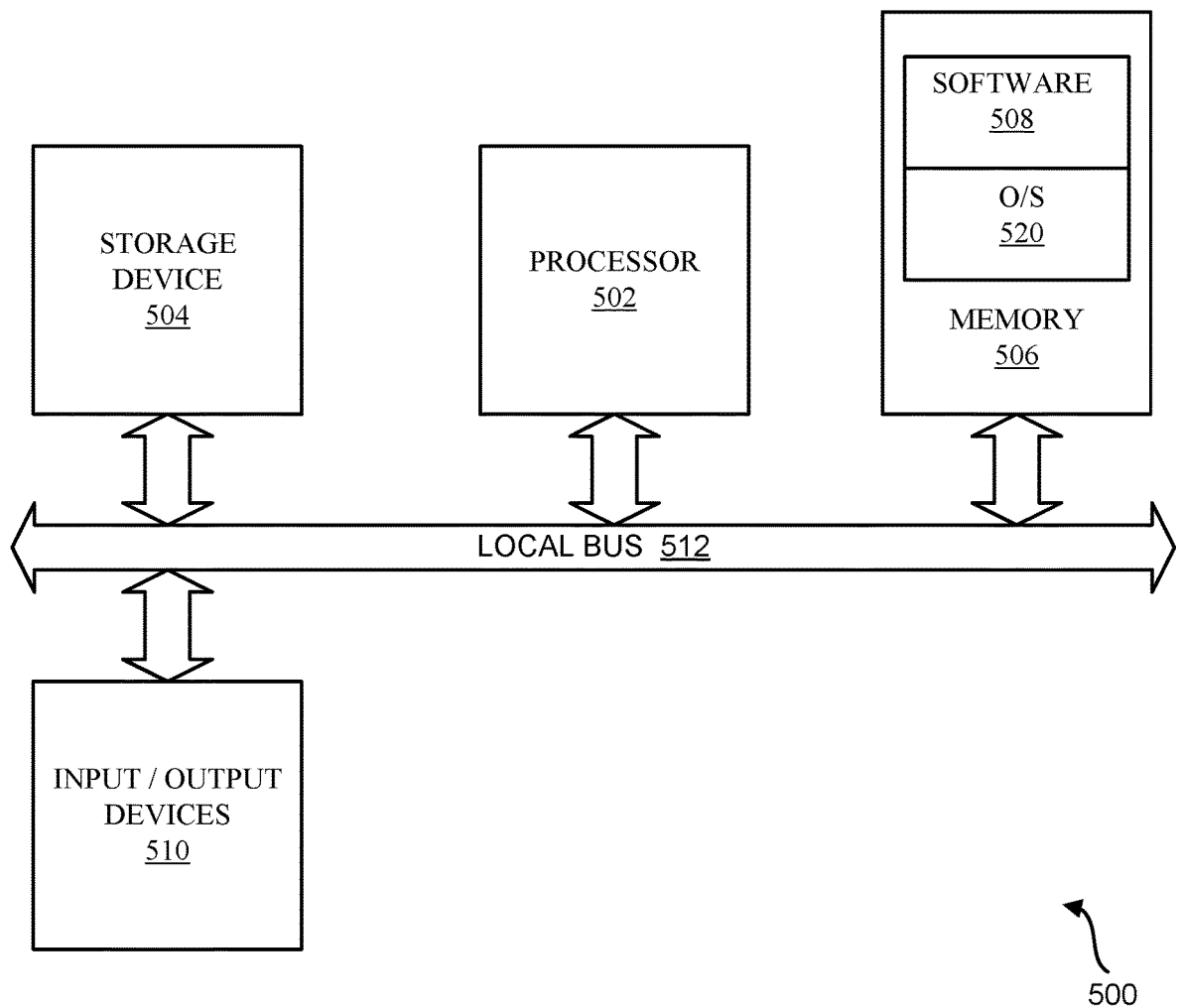
FIG. 5 is a schematic diagram illustrating an example of a system for executing functionality of the present invention.

The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In addition to the benefits of the embodiments described above, use of FAST embodiments may avoid flickering introduced by individual frame based video enhancement. Running video enhancement algorithm such as SR frame by frame may ignore the temporal correlation between the same object in two adjacent frames. Even if the object just moves slightly, the video enhancement algorithm may enhance its appearances in two different frames differently, causing the flickering. FAST avoids this effect by exploiting the motion vectors and the residue in the compressed video frame, which captures the temporal correlation. Therefore, the enhanced frame of FAST embodiments depends on the enhanced result of previous frame, which enforces the temporal consistency and avoids the flickering.

In summary, embodiments described above exploit information embedded in compressed video that previously had not been used for super-resolution algorithms, including prediction residuals, and varying block sizes. These embodiments may incorporate non-overlapping blocks and deblocking filters for super-resolution, and take advantage of the fact that many blocks of pixels in typical video sequences have either zero motion vectors or zero prediction residuals. Thus, in addition to reducing SR processing, this avoids unnecessary bicubic interpolation.

Since the embodiments described above consume significantly less time, processor, and power resources as full SR processing, the embodiments may be incorporated into platforms where full SR processing may previously have been impractical, for example, in smart phones, tablets, televisions, computers, and other consumer, commercial, and industrial video display devices that presently handle and process compressed video. Therefore, the exemplary methods directly improve the functionality of the video processing of devices and systems executing the methods by providing higher video resolution using less processing and power. Additional improvements may include, for example, lower heat production and greater energy efficiency. Further, the reduction in processing requirements may provide some systems to provide real-time SR capabilities to systems without processing capacity to provide frame-by-frame SR processing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for displaying video on a display by a real-time video processing device comprising a processor and a memory containing non-transient instructions that, when executed by the processor, comprise the steps of:
   receiving compressed video data;
   decoding the compressed video data to produce an uncompressed first video frame, a first frame syntax element, an uncompressed second video frame adjacent to the first video frame in a video sequence, and a second frame syntax element;
   applying a first video enhancement process to the uncompressed first video frame to produce an enhanced first video frame having a higher resolution than the uncompressed first video frame;
   applying an adaptive deblocking filter to the enhanced first video frame;
   applying a second process to the uncompressed second video frame to produce an enhanced second video frame, further comprising the steps of:
      adaptively transferring a block comprising a portion of the enhanced first video frame from the enhanced first video frame to the uncompressed second video frame according to the first frame syntax element and the second frame syntax element to produce the enhanced second video frame having a higher resolution than the uncompressed second video frame; and
      displaying the enhanced first video frame and the enhanced second video frame with the display;
   accumulating a metric for a parameter indicating a computation cost change and/or a quality change between the enhanced first video frame and the enhanced second video frame;
   determining an accumulated metric threshold value; and
   comparing the accumulated metric to the accumulated metric threshold,
   wherein the first video enhancement process is more computationally intensive than the second video enhancement process, and the second video enhancement process leverages an inter-frame similarity between adjacent frames in the video sequence and transfers an enhancement result from the first enhanced video frame to the second enhanced video frame.

2. The method of claim 1 wherein the first frame syntax element further comprises a size of the block and a source position of the block, and the second frame syntax element further comprises the size of the block, and a target position of the block.

3. The method of claim 1, wherein the compressed video data comprises a compressed video bit stream.

4. The method of claim 2, further comprising the step of determining a spatial relationship between pixels in the uncompressed first video frame and pixels in the uncompressed second video frame based upon the first frame syntax element and/or the second frame syntax element.

5. A method of claim 4, further comprising the step of avoiding processing to speed up a rendering of the enhanced second video frame based at least in part on the spatial relationship between pixels in the uncompressed first video frame and pixels in the uncompressed second video frame.

6. The method of claim 4, further comprising the step of combining a first pixel from the uncompressed first video frame with a related second pixel from the uncompressed second video frame for improving an image quality in the enhanced second video frame.

7. The method of claim 6, wherein the improving the image quality in the enhanced second video frame comprises super resolution enhancement, dynamic range expansion, object recognition and/or detection, optical flow estimation, time-to-contact estimation, tracking in videos, video stabilization, video segmentation, frame interpolation, scene understanding, visual style editing, deblurring, high dynamic range enhancement, and reducing a level of noise in the enhanced second video frame.

8. A method of claim 1, wherein the first frame syntax element and/or the second frame syntax element comprises one or more of the group consisting of a motion vector, a block structure, a residual and/or prediction error, a transform coefficient, an inter prediction mode, an intra prediction mode, an intra prediction mode direction, a skip flag, a merge flag, a coded block flag, a loop filter parameter, a quantization parameter, and a reference index.

9. The method of claim 1, further comprising the steps of:
   decompressing the compressed video data to produce an uncompressed third video frame, and a third frame syntax element; and
   transferring a block comprising a portion of the enhanced second video frame from the enhanced second video frame to the uncompressed third video frame according to the frame syntax element and the third frame syntax element to produce an enhanced third video frame having a higher resolution than the uncompressed third video frame without applying the first video enhancement process to the uncompressed third video frame.

10. The method of claim 9, wherein the third frame syntax element further comprises the size of the block, and a second target position of the block.

11. The method of clam 1, further comprising the steps of:
   for an enhanced first video frame and an enhanced second video frame where the accumulated metric is below the accumulated metric threshold value, adaptively transferring a block comprising a portion of the enhanced second video frame from the enhanced second video frame to a uncompressed third video frame to produce an enhanced third video frame without applying the first video enhancement process to the uncompressed third video frame,
   for an enhanced frame an enhanced second video frame where the accumulated metric meets or exceeds the accumulated metric threshold value, producing an enhanced third video frame using the computationally intensive process.

12. The method of claim 1, wherein applying the first video enhancement process to the uncompressed first video frame to produce the enhanced first video frame further comprises dividing the enhanced first video frame into a plurality of non-overlapping blocks so that each pixel is included by exactly one block of the plurality of non-overlapping blocks.

13. The method of claim 12, wherein a first block of the plurality of non-overlapping blocks comprises a larger number of pixels than a second block of the plurality of non-overlapping blocks, wherein the pixels of the first block correspond to a simpler structure and/or better-predicted content than the pixels of the second block.

14. The method of claim 1, further comprising the step of for blocks with zero motion vector and/or zero residual, directly copying the same pixels from the enhanced first video frame to the uncompressed second video frame without interpolation.

15. The method of claim 1, wherein the accumulated metric comprises an indication of accumulated error, and the accumulated metric threshold comprises an accumulated error threshold.

16. A real-time video display system comprising:
   a decoder comprising a first processor and a first memory containing non-transient instructions that, when executed by the first processor, comprise the steps of:
      receiving compressed video data; and
      decoding the compressed video data to produce an uncompressed first video frame, a first frame syntax element, an uncompressed second video frame adjacent to the first video frame in a video sequence, uncompressed second video frame, and a second frame syntax element;
   a video processing device in communication with the decoder comprising a second processor and a second memory containing non-transient instructions that, when executed by the second processor, comprise the steps of:
      applying a first video enhancement process to the first uncompressed video frame to produce an enhanced first video frame having a higher resolution than the uncompressed first video frame; and
      applying a second process to the uncompressed second video frame to produce an enhanced second video, further comprising the steps of:
         adaptively transferring a block comprising a portion of the enhanced first video frame from the enhanced first video frame to the uncompressed second video frame according to first frame syntax element and the second frame syntax element to produce the enhanced second video frame having a higher resolution than the uncompressed second video frame,
      wherein the first video enhancement process is more computationally intensive than the second video enhancement process, and the second video enhancement process leverages an inter-frame similarity between adjacent frames in the video sequence and transfers an enhancement result from the first enhanced video frame to the second enhanced video frame; and
   a video display configured to display the enhanced first video flame and the enhanced second video frame with the display.

17. The system of claim 16, wherein the video processing device is configured to access a processing module of the decoder.

18. The system of claim 17, wherein the processing module is configured to execute a functionality of one of the group consisting of super resolution processing, deblocking processing, and motion compensation processing.

19. The system of claim 16, further comprising a decoder memory buffer, wherein the video processing device is configured to access the decoder memory buffer.

* * * * *